United States Patent [19]
Bane

[11] Patent Number: 5,481,259
[45] Date of Patent: Jan. 2, 1996

[54] METHOD FOR READING A PLURALITY OF REMOTE METERS

[75] Inventor: Ronald L. Bane, Stone Mountain, Ga.

[73] Assignee: Motorola, Inc., Schaumburg, Ill.

[21] Appl. No.: 236,078

[22] Filed: May 2, 1994

[51] Int. Cl.$^6$ .................................................. G08C 17/00
[52] U.S. Cl. ............................... 340/870.03; 340/870.11; 340/505; 340/825.47; 455/38.3
[58] Field of Search ...................... 340/870.03, 870.02, 340/870.11, 870.41, 505, 825.06, 825.14, 825.44, 825.47, 825.54; 455/38.2, 38.3, 56.1, 343

[56] References Cited

U.S. PATENT DOCUMENTS 4,614,945  9/1986  Brunius et al. ..................... 340/870.03

*Primary Examiner*—Brent A. Swarthout
*Assistant Examiner*—Andrew Hill
*Attorney, Agent, or Firm*—Andrew S. Fuller; Kenneth M. Massaroni

[57] ABSTRACT

A remote meter reading system (10) includes a group of meter interface units in which each meter interface unit (12) operates between periods of activity and inactivity. The plurality of meter interface units (12) are assigned to groups each of the meter groups having a sleep rate assigned. Upon reading each of the meter interface units (12) the sleep rate assigned to the meter interface units (12) in each of the groups is advanced to the next group's sleep rate. This process is cycled through all of the meter groups in the system in order for all of the meter interface units to have approximately the same amount of overall battery savings.

17 Claims, 3 Drawing Sheets

400

METHOD FOR READING A PLURALITY OF REMOTE METERS

TECHNICAL FIELD

This invention relates in general to remote meter systems, and more specifically, to a method for reading a plurality of remote meters in a remote meter system.

BACKGROUND

Utility companies, and similar entities, have started to take advantage of modern technology to reduce costs and increase efficiency in meter reading applications. Traditionally, meters, such as electric, water, and gas meters, have been manually read by a person physically reading each meter. However, recent developments have provided for meters which can be remotely accessed from a central location through wire or wireless (e.g., radio frequency, etc.) communication links. Oftentimes, these remotely accessible meters have battery powered meter interface units which can access the meter status information, and which can communicate via radio frequency signals the meter status information to a remotely situated meter reading device. In such cases, issues associated with power consumption management are an important since the meter interface devices in the system are typically battery operated.

In a typical operational environment, a meter reading system includes a large number of remote meters which are connected to meter interface units. Low maintenance battery-operated meter interface units are desirable to facilitate operating efficiency and to reduce maintenance costs. Therefore, it is desirable to have a meter interface unit which can operate for an extended period of time without requiring frequent maintenance for battery replacement and the like. Such maintenance requirements may be reduced by increasing the battery capacity used by each of the meter interface units or by reducing the power consumed by each meter interface unit. The more viable option of reducing power consumption at the battery powered meter interface unit is usually pursued due to the added cost and space increase problems brought about by trying to solve the problem by using a larger capacity battery. For example, the meter interface device may be placed in a sleep or low power operating mode when there is no ongoing communication with a meter reading device. A trade off is usually made between the availability of the meter interface device for communications with the meter reading device and the amount of power consumption savings which can be achieved. A meter interface device employing a power consumption saving technique may not be able to communicate with the remote meter reading device given that the radio circuitry or sections of circuitry in the meter interface unit may be shut-off when the unit is in the sleep mode in order to conserve the unit's battery energy.

As been discussed, above, there exists a need for a method of reading a plurality of remote meters in a way which provides for improved battery savings for the remote meter interface units and at the same time also does not adversely affect the acquisition time required to read the plurality of meter interface units.

DETAILED DESCRIPTION OF THE PREFERRED EMBODIMENT

Generally, the present invention provides for a method of reading a plurality of remote meter interface units which are part of a remote meter system. A remote meter reading device can remotely retrieve meter information from each of the remote meter interface units which are part of the system. Preferably, the meter reading device and the remotely situated meter interface units are capable of communicating with each other using radio frequency signals. In this meter reading system, the remote meter interface units have a power consumption management system which allows each meter interface unit to operate in a reduced power consumption mode (also known as a battery saving mode, or sleep mode or inactive mode). The remote units achieve power consumption savings by alternating between active (operational state) and inactive or battery saving states. While in an battery saving state the meter interface units can not communicate with the meter reading device. However, the remote units are periodically activated to enable communications capabilities, and during such period, the remote units are responsive to communication signals initiated by the remote meter reading device.

Figure 1:
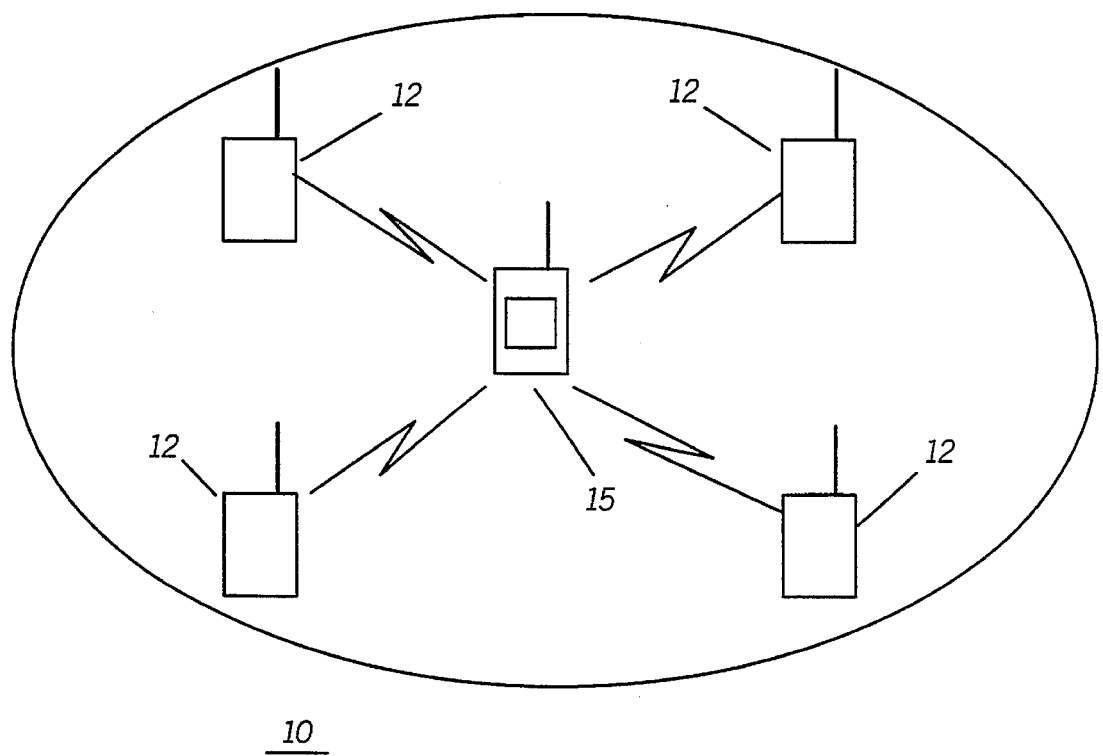
FIG. 1 shows a representation of a remote meter reading system in accordance with the present invention.

Referring now to the drawings and specifically to FIG. 1, there is shown a representation of a remote meter reading system 10 in accordance with the present invention. The system includes at least one meter reading device 15, and a group of remotely located meter interface units 12. The meter reading device 15 is situated such that it is in within communication range of the group of meter interface units 12.

Figure 2:
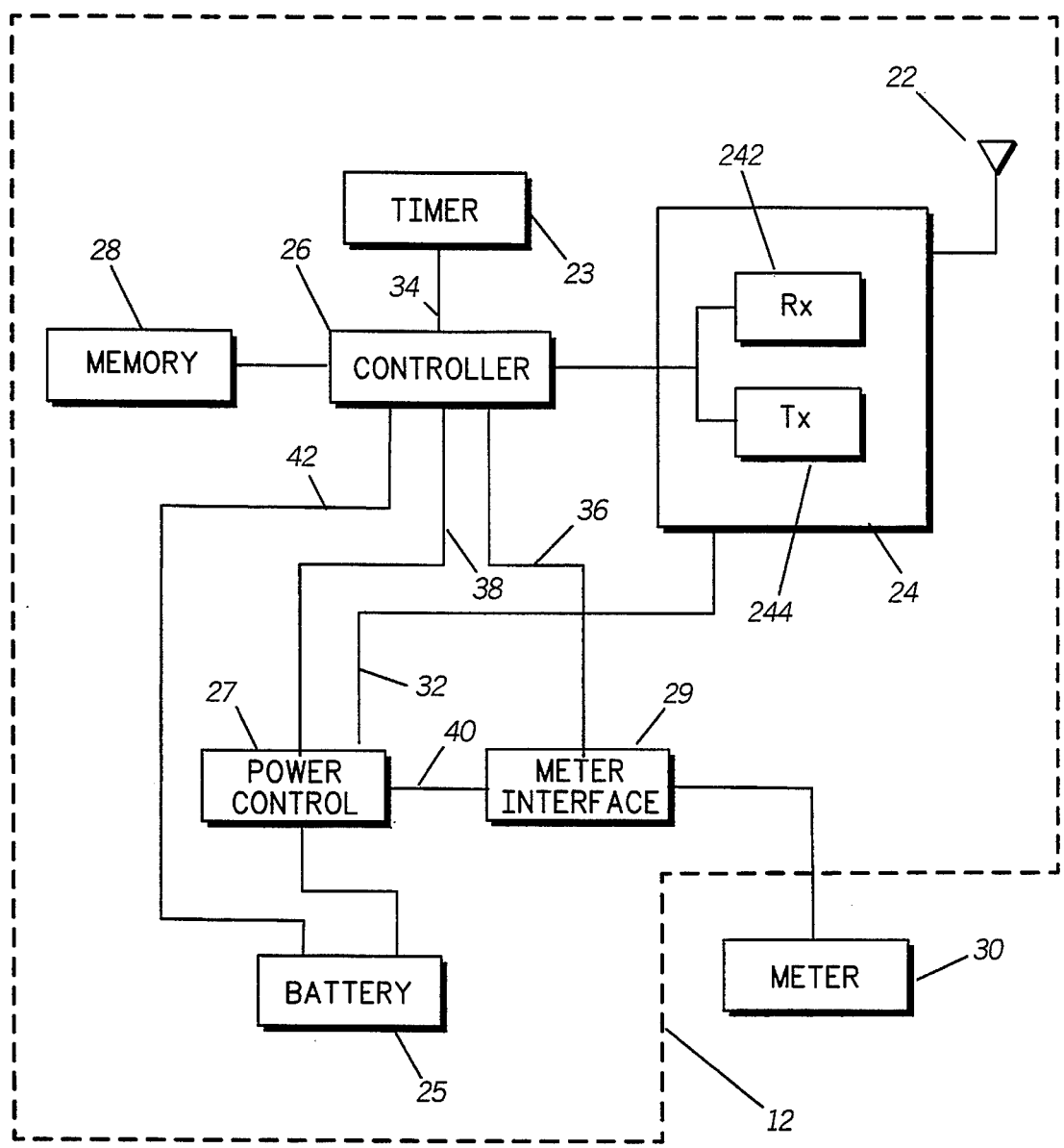
FIG. 2 shows a block diagram of a meter interface unit attached to a meter in accordance with the present invention.

In FIG. 2, a block diagram of a meter interface unit 12 is shown in accordance with the present invention. The meter interface unit 12 provides an interface for reading a meter 30, such as an electricity meter, a water meter, a gas meter, or other similar devices. Additionally, the meter interface unit 12 provides remote access to the functions of the meter 30 (e.g., amount of electricity consumption measured by the meter, etc.). The meter interface unit 12 includes a controller 26, memory section 28, a radio frequency transceiver 24, a meter interlace portion 29, timer circuit 23, battery 25, and power control section 27. Controller 26 is implemented using a well known microprocessor or microcontroller as known in the art. The meter interface portion 29 is electrically coupled to meter 30 and provides access to the functions of the meter. In most applications, meter interface portion 29 takes information from meter 30 and provides the meter information to controller 26 so that it can then send the information to the meter reading device. The design of meter interface portion 29 will depend on the type of meter 30 which will be interfaced. Typically, meter interface circuit 29 will comprise a conventional serial digital interface which is used to acquire the digital information provided by meter 30. The power control section 27 controls the battery power supplied from battery 25 to select circuitry in meter interface unit 12 and facilitates the operation of power consumption management. Memory section 28 preferably includes random access memory (RAM), read-only memory (ROM), etc.

Radio frequency (RF) transceiver 24 is capable of receiving and transmitting communication signals over a communication channel, such as a RF channel via antenna 22, using well-known principles. Transceiver 24 can comprise a conventional frequency modulated (FM) transceiver as is well known in the art. The controller 26 uses the information such as software programs, etc. stored in the memory block 28 to control the overall operation of the meter interface unit 12. The controller 26 is electrically coupled to the RF transceiver 24 and provides the overall control for the RF transceiver 24. For receive operations, communication signals are received by the antenna 22 and are selectively processed by the receiver 242. Similarly, for transmit operations, communication signals are processed by the transmitter 244 and radiated through the antenna 22. The memory block 28 can store information received by the meter interface unit 12, such as information sent by meter reading device 15.

The meter interface unit 12 is operable in an inactive or battery saving state to reduce power consumption. In the inactive state, select circuitry in the meter interface unit 12 have battery power to them shut-off, in order to conserve the battery capacity of battery 25. Preferably, meter interface unit 12 is periodically operable in an activated or operational state in order to monitor its RF communication channel for channel activity directed at the meter interface unit 12. The RF transceiver 24 is activated by power supplied under the control of the power control circuit 27 via bus 32. Timer 23 provides a conventional time base which communicates with controller 26 via bus 34. Timer circuit 23 activates the controller 26 at specific time intervals, preferably either at 8 or 512 second intervals. Real time is approximated by the controller 26 using this time base provided by timer circuit 23. The power control circuitry 27 is controlled by the controller 26 which also has overall control of meter interface unit 12. Battery power is provided directly to controller 26 via power line 42 since controller 26 has to have power available to it at all times. In order to conserve even more battery energy, controller 26 can also be placed in a reduced current mode (which is available on many conventional microprocessors) during select periods of time.

The controller 26 provides the battery saving control signal to power control circuit 27 via bus 38. Upon receipt of the control signal, the power control circuit 27 supplies power to the transceiver 24 from the electrically coupled battery 25 via power bus 32. When the control signal is removed, battery 25 is disconnected from transceiver 24, thereby reducing the meter interface unit's current drain. Controller 26 communicates with meter interface circuit 29 via bus 36. Battery energy is supplied from battery 25 to meter interface unit 29 via power bus 40. Depending on the amount of battery conservation desired, all circuits except for controller 26 and timer 23 can be shut-off from battery power in order to conserve energy during battery saving periods.

The meter interface unit 12 is responsive to messages received over the monitored radio frequency communication channel at receiver 242. The received message may include specific commands which require a response from the meter interface unit 12. These commands include wake-up requests or activation signals, meter reading requests (e.g., meter reading device 15 requesting meter data from meter 30, such as how much electricity consumption has occurred, etc.), etc. The meter interface unit 12 responds to a wake-up request by operating in an activated state for an extended time period. In response to a meter reading request, the meter interface unit 12 communicates with meter 30 through the meter interface portion 29 to extract status information from the meter 30. The meter status information can then be transmitted via transmitter 244 to meter reading device 15. In the preferred embodiment, the meter interface unit 12 responds to meter reading requests with status information from the meter.

Preferably, the wake-up messages sent by the meter reading unit also includes a read request portion which requests meter information from a particular unit. In other words, the wake-up message comprises an information packet having a wake-up portion and a portion which informs a particular meter to send back to the meter reading device meter information such as amount of power consumed, etc. In the preferred embodiment, the wake-up portion of the packet will make any meter in the system which is at that point in an operational state maintain itself in the operational state for a predetermined period of time or until the meter reading device addresses the meter with a request for meter information.

Figure 3:
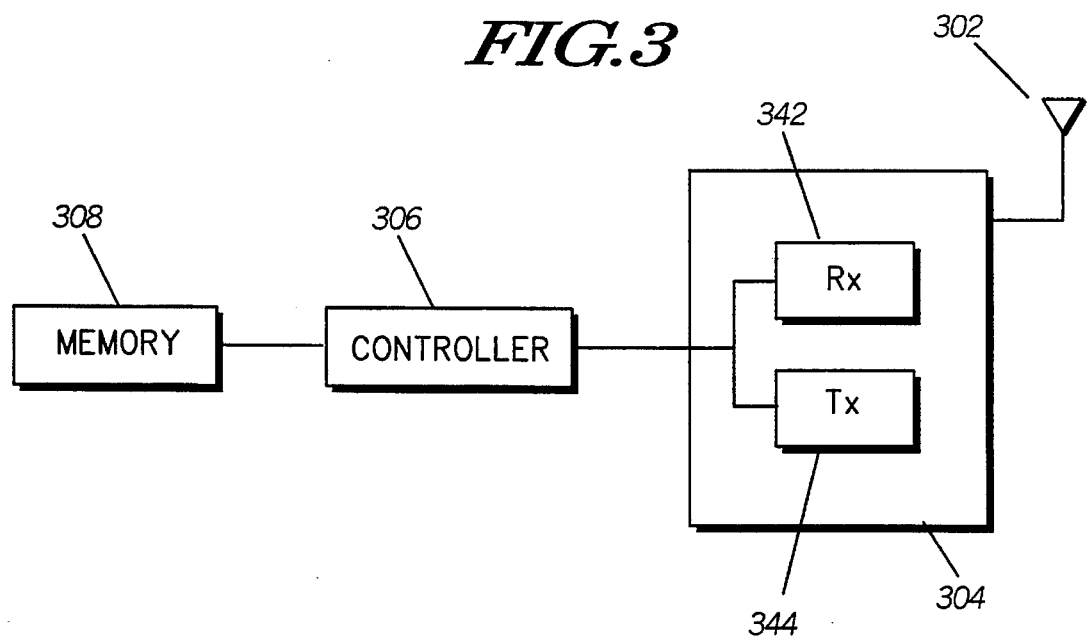
FIG. 3 shows a block diagram of a meter reading device in accordance with the present invention.

Referring to FIG. 3, a block diagram of a meter reading device 15 is shown in accordance with the present invention. The meter reading device 15 has communications capability similar to those described with respect to the meter interface unit 12. Accordingly, the meter reading device 15 has a controller 306, a memory block 308, and a RF portion 304, including a receiver 342 and transmitter 344, for providing two-way communications through an antenna 302. The memory block 308 provides storage capability for the meter reading device 15. Data is stored in the memory block 308 for facilitating the operation of the meter reading device 15. This data may include addresses, or unit identifiers, for the meter interface units 12, group identifiers for the meter interface units 12, and other information needed to facilitate the meter reading system 10. Data may be pre-programmed in the meter reading device 15, or the data may comprise information, which is provided remotely via RF signals such as from a meter system control station. The meter reading device 15 is capable of initiating communication with the group of remotely situated meter interface units 12 over one or more communication channels or radio frequency channels.

The meter reading device 15 initiates communications by transmitting a read request addressed to a specific or target meter interface unit 12 or a group of meter interface units. In the preferred embodiment the read request is part of a wake-up message. The meter reading device 15 then waits to receive a message from the meter interface units 12. The message sent by meter interface unit 12 contains meter status information. The meter reading device 15 is also capable of transmitting over the radio frequency communication channel to a group of meter interface units 12, a message containing a wake-up request, along with a group identifier in order to activate for an extended time, the group of meter interface units 12. Although not shown, the meter reading device of FIG. 3 can also include a display and keypad to allow the user more access to information from the remote meter interface devices 12 which are to be read.

Figure 4:
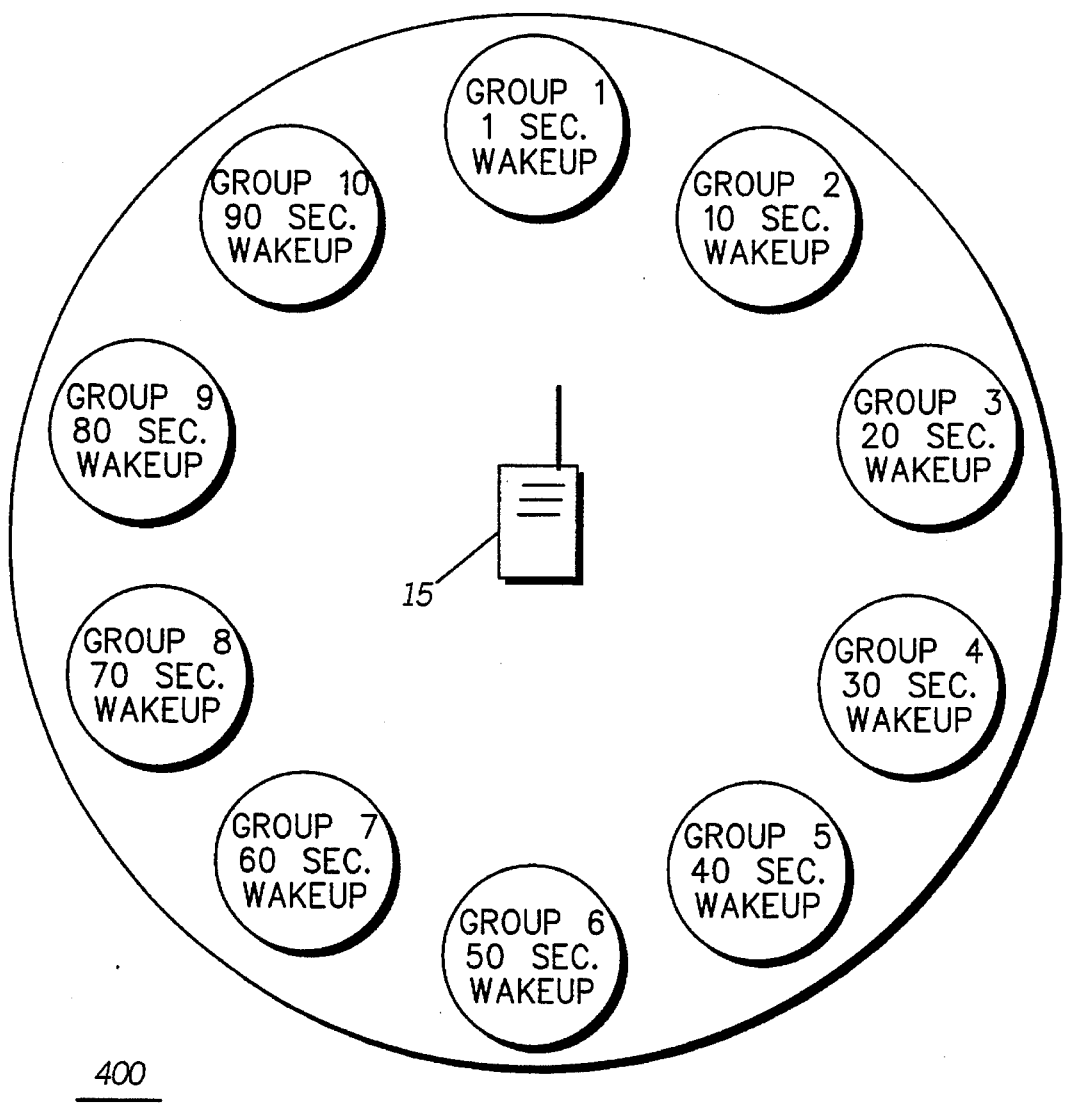
FIG. 4 shows a diagram showing a remote meter reading system and how each of the meter interface units are read in accordance with the invention.

Referring to FIG. 4, a diagram showing the method of how a plurality of remote meter interface units are read by a meter reading device in accordance with the present invention is shown. In FIG. 4, the plurality of meter interface units are separated into 10 groups with each of the groups having 100 meter interface units, for a total of 1000 units in meter system 400 for illustrative purposes. In order to read such a large number of remote meter interface units from a single point, as is the case when using a hand held meter reading device as shown in FIG. 3, battery savings can be achieved while maintaining or improving average acquisition time by distributing sleep periods of variable duration throughout the overall read time (i.e., the time it takes the meter reading device to read all 1000 meter interface units).

For illustration purposes, we will assume for the system in FIG. 4 that it takes 100 millisecond to read the data from each of the plurality of meter interface units. Therefore, in order to read the 1000 meter interface units in system 400 it will take approximately 100 seconds (this assumes minimal overhead delay in switching from one meter interface unit to the next). In accordance with the invention each group is assigned different wake-up periods as shown in FIG. 4. For example, the first meter group, group 1 is given a I second wake-up period, the second meter group or group 2, is given a 10 second wake-up period, etc. All remote meter interface units in group 1 will wake-up within 1second of the read process, those in group 2 will wake-up within 10 seconds of the read process starting (i.e., first meter interface unit being read by the remote meter reading device). The read process consists of providing a repeating transmission message from the meter reading device 15 which requests information from a meter interface unit 12 and simultaneously indicates to each unit in all groups to remain in an active communication mode. Upon completion of acquiring information from the first unit, a second unit is interrogated. The process continues for all units of group 1. When sharing a single communication channel, the awaking meter interface units must monitor the channel long enough to cover the gap in transmission while other meter interface units respond. After completion of reading group 1 all of group 2 would be awake and ready to be read. This is the case since by the time the 100 units in group I have been read over 10 seconds have expired. Likewise, group 3 will be ready to be read after 20 seconds, and so on for the other groups.

Preferably, upon completion of meter reading device 15 reading a meter interface unit, the meter interface unit that sent the meter information will automatically advance to the next group's wake-up rate upon completion of its transmission. For example, the units in group 1 will follow a 10 second wake-up period for the next read cycle, since they will advance to the wake-up rate held by the units in the next group, group 2. The wake-up rate controls the amount of time each unit in the meter group will stay in their battery saving mode until they go back to their fully operational state. This automatic advancement to the next group's wakeup rate is continued until each group cycles through all of the wake-up rates in the system (i.e., in this particular example, once group 1 gets to the 90 second wake-up period), at which point the first meter group finally cycles through to its original sleep rate (one second rate) and then begins to cycle through the sleep periods anew.

The automatic advancement of wake-up rates provides for the meter interface units in each group to achieve the same amount of battery savings over an extended period of time. In this particular example, over the operational life of each meter interface unit, the average sleep time will be approximately 45 seconds (calculated by summing the total wake 15 up periods and dividing by 10 groups) with a response time of approximately 1 second.

The meter interface units stay in the fully operational state for a predetermined period of time to see if any communications by a meter reading unit is taking place. If any meter interface unit detects a wake-up message it will stay in the operational state for a predetermined time period or until a wake-up message includes a meter request packet addressed to the unit. The wake-up periods selected in the system provide that by the time the meter reading device reads the information from one group, all of the meters in the next group to be read have received a wake-up message placing then in the operational state. This method not only provides the meter interface units with improved battery savings, but also reduces the access time for reading the meters since the meters to be read next, are already in the operational state by the time the meter reading device 15 is ready to read them.

Alternatively, instead of cycling the wake-up periods of each meter group to the next meter group clockwise in the system (e.g., from group 1 to 2, etc.), if there is a means for determining the battery status of each meter interface unit (e.g., by determining the amount of operation time each unit has undergone, taking a voltage measurement of the battery on each meter interface unit, etc.), an alternate approach for determining the group assignment could be used. For example, the meter reading device, having access to all the unit's battery status, could assign the next wake-up period on a need basis. For example, units with lower battery capacity remaining could be assigned longer sleep rates.

During the time the meter interface units are in the sleep mode, select portions of circuitry such as the transceiver 24 in FIG. 2 are disconnected by power control circuitry 27 in order to reduce the amount of energy being consumed from battery 25.

In summary, the present method for reading a plurality of meters in a meter system provides for increased battery savings to the meter interface units, while at the same time the overall time it takes to access information from the meter interface units is not increased. The reading process provides also for a way of automatically cycling the sleep rates assigned to the units in order for all meter interface units in the system to have an approximately even amount of battery savings (i.e., over time their average sleep mode time will be almost equal for all of the units).

What is claimed is:

1. A method of reading meter status information from a plurality of remote meter interface units using a meter reading device, the plurality of remote meter interface units are partitioned into at least first and second meter groups, all of the meter interface units assigned to the first meter group have a first sleep period assigned to them, while all of the meter interface units assigned to the second meter group have a second sleep period assigned to them, the method comprising the steps of:

(a) transmitting, by the meter reading device, a message indicating operation of a meter read process;

(b) receiving, by a select one of the meter interface units in the first meter group, the message;

(c) operating the select one meter interface unit in a sleep mode for a duration of the first sleep period;

(d) requesting, by the meter reading device, meter status information from the select one meter interface unit;

(e) transmitting the meter status information from the select one meter interface unit in the first meter group to the meter reading device; and (f) changing the sleep period assigned to the select one meter interface unit from the first sleep period to the second sleep period.

2. A method of reading a plurality of remote meter interface units as defined in claim 1, comprising the further steps of:

(g) repeating steps (a) through (f) until all of the meter interface units partitioned into the first meter group have transmitted meter status information to the meter reading device;

(h) requesting meter status information from a select one of the meter interface units in the second meter group;

(i) transmitting the meter status information from the select one meter interface unit in the second meter group to the meter reading device; and (j) changing the sleep period assigned to the select one meter interface unit from the second sleep period to the first sleep period.

3. A method of reading a plurality of remote meter interface units as defined in claim 1, wherein step (d) comprises the sub-steps of:

(d1) transmitting a wake-up message to all of the plurality of remote meter interface units; and (d2) simultaneously transmitting as part of the wake-up message a request for meter status information from the select one meter interface unit in the first meter group.

4. A method of reading meter status information from a plurality of meter interface units using a meter reading device, the meter interface units are partitioned into at least first and second meter groups and each meter group of the first and second meter groups have a different sleep period assigned, the sleep period for each meter group being assigned to each of the meter interface units of the group, the method comprising the steps of:

(a) transmitting a wake-up message from the meter reading device;

(b) receiving meter status information at the meter reading device from one of the meter interface units located in the first meter group;

(c) continuing to receive meter status information at the meter reading device from all of the remaining meter interface units partitioned into said first meter group; and (d) changing the sleep period of all of the meter interface units partitioned into said first meter group.

5. A method of reading meter status information from a plurality of meter interface units as defined in claim 4, wherein step (a) comprises the sub-steps of:

(a1) transmitting a wake-up message to all of the plurality of remote meter interface units; and (a2) simultaneously transmitting as part of the wake-up message a request for meter status information from the one meter interface unit in the first meter group.

6. A method for reading information from a plurality of meter interface units as defined in claim 4, wherein step (d) comprises changing the sleep period assigned at each of the meter interface units assigned to the first group after the meter reading device receives the meter status information from each meter interface unit of the first group.

7. A method for information from a plurality of meter interface units as defined in claim 4, wherein step (a) comprises transmitting the wake-up message using a radio frequency transmitter.

8. A method for gathering meter status information from a first meter interface unit having a first sleep period assigned to it and a second meter interface unit having a second sleep period assigned to it, the sleep periods of each of the first and second meter interface units determine the periods of time the respective meter interface units will be in a battery-saving mode, rather than an operational mode in which the respective meter interface units are responsive to communications from the meter reading device, the method comprising the steps of:

(a) receiving a request for meter status information at the first meter interface unit;

(b) sending the requested meter status information from the first meter interface unit; and (c) switching the sleep period assigned to the first meter from the first to the second sleep period.

9. A method as defined in claim 8, comprising the further steps of:

(d) receiving a request for meter status information at the second meter interface unit;

(e) sending the requested meter status information from the second meter interface unit; and (f) switching the sleep period assigned to the second meter interface unit from the second sleep period to the first sleep period.

10. A method as defined in claim 8, wherein the sleep period assigned to the second meter interface unit is such that it guarantees that the second meter will be in the operational mode before step (d) is performed.

11. In a meter reading system having a plurality of meter interface units and a meter reading device, a method comprising the steps of:

assigning a sleep period to each meter interface unit of the plurality of meter interface units, the sleep period of each meter interface unit differing from that of at least one other of the plurality of meter interface units;

transmitting, by the meter reading device, a message indicating operation of a meter read process;

detecting, by a particular meter interface unit, the message from the meter reading device indicating operation of the meter read process;

operating the particular meter interface unit in a sleep mode for the assigned sleep period before placing the particular meter interface unit in an operational state for at least a predetermined time period to await communications from the meter reading device.

12. The method of claim 11, further comprising, after the step of operating the particular meter interface unit in a sleep mode, the step of assigning to the particular meter interface unit a different sleep period for a subsequent sleep mode.

13. The method of claim 12, wherein the step of assigning to the particular meter interface unit a different sleep period, comprises the step of transmitting, by the meter reading device, the different sleep period to the meter interface unit.

14. The method of claim 12, further comprising the step of communicating, by the particular meter interface unit, with the meter reading device to transfer meter status information while in the operational state.

15. The method of claim 14, further comprising the steps off partitioning the plurality of meter interface units into a plurality of meter groups;

assigning differing sleep periods to each meter group; and assigning to each meter interface unit within a particular meter group the sleep period assigned to the particular meter group.

16. The method of claim 15, further comprising the step of requesting, by the meter reading device, meter status information from all of the meter interface units of a particular meter group before attempting to request meter information from a meter interface unit of another meter group.

17. The method of claim 16, wherein the step of requesting comprising the step of requesting meter status information from each meter group in an order corresponding to the duration of the sleep periods of the respective meter groups.

* * * * *